(12) United States Patent
Brandwine

(10) Patent No.: US 9,703,976 B1
(45) Date of Patent: *Jul. 11, 2017

(54) ENCRYPTION FOR PHYSICAL MEDIA TRANSFER

(71) Applicant: Amazon Technologies, Inc., Reno, NV (US)

(72) Inventor: Eric Jason Brandwine, Haymarket, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,240

(22) Filed: Jun. 17, 2015

(51) Int. Cl.
*G06F 21/00* (2013.01)
*G06F 21/62* (2013.01)
*G06F 21/60* (2013.01)
*H04L 29/06* (2006.01)

(52) U.S. Cl.
CPC ........ *G06F 21/6218* (2013.01); *G06F 21/602* (2013.01); *G06F 21/606* (2013.01); *H04L 63/0435* (2013.01)

(58) Field of Classification Search
CPC .................................................... G06F 21/602
See application file for complete search history.

(56) References Cited

U.S. PATENT DOCUMENTS

| | | | | |
|---|---|---|---|---|
| 7,143,445 B1* | 11/2006 | Ishiguro | ........... | G11B 20/00086 713/189 |
| 8,028,067 B2* | 9/2011 | Holden | ........... | G06F 21/31 709/225 |
| 9,571,619 B2* | 2/2017 | Akama | ........... | G01C 21/3664 |
| 2008/0022089 A1* | 1/2008 | Leedom | ........... | H04L 63/068 713/156 |
| 2009/0292641 A1* | 11/2009 | Weiss | ........... | G06F 21/32 705/66 |
| 2010/0274859 A1* | 10/2010 | Bucuk | ........... | H04L 63/08 709/206 |
| 2012/0243687 A1* | 9/2012 | Li | ........... | H04L 9/085 380/277 |
| 2014/0169554 A1* | 6/2014 | Scarisbrick | ........... | H04L 9/0863 380/28 |
| 2015/0012287 A1* | 1/2015 | Vucovich | ........... | G06F 19/363 705/2 |
| 2015/0143482 A1* | 5/2015 | Barkan | ........... | G06F 21/57 726/5 |

(Continued)

*Primary Examiner* — Ali Shayanfar

(74) *Attorney, Agent, or Firm* — Hogan Lovells US LLP

(57) ABSTRACT

Large volumes of data to be securely imported to, and exported from, a data storage service or other such location in a secure manner without a customer having to manage keys or encryption. A data management component can execute on a client device that can identify data to be stored and obtain the appropriate key for encrypting the data. Once the data is encrypted, the data can be written to a portable storage device, which can be shipped to the data storage service. When the device is received to the data storage service, an ingestion station reads the encrypted data and causes the encrypted data to be stored to the data storage service. The data remains encrypted from the client device through being stored to the data storage service. When a request for the data is received, the data can be decrypted and returned in response to the request.

20 Claims, 10 Drawing Sheets

(56) References Cited

U.S. PATENT DOCUMENTS

| | | | |
|---|---|---|---|
| 2015/0234022 A1* | 8/2015 | Shih | G01R 33/481 600/411 |
| 2016/0234022 A1* | 8/2016 | Motika | H04L 9/3213 |
| 2016/0295491 A1* | 10/2016 | Ponnuswamy | H04W 48/20 |

* cited by examiner

ENCRYPTION FOR PHYSICAL MEDIA TRANSFER

BACKGROUND

Users are increasingly causing data to be stored in resource environments or "the cloud." This has many advantages, as the user can have data stored in a secure location without the need to purchase dedicated hardware or manage the storage process. It also offers redundancy for data that also stored by a user. In many cases the data may be confidential or otherwise sensitive such that the user may want to submit the data using a secure channel. While transmitting data, which may be encrypted, over a secure connection is possible, it can be impractical for extremely large data sets. Further, some users may not be comfortable sending their data across a network operated by, and accessible to, various third parties. In some situations a user can provide a physical storage device that includes the sensitive data for import into the resource environment. While this enables large amounts of data to be transferred, the device will still be in the hand of a third party such as a commercial carrier over which the user has little control or supervision. Further, a person must attempt to correlate the device with the proper account and cause the information to be stored in the proper location with the appropriate access and security in the resource environment.

BRIEF DESCRIPTION OF THE DRAWINGS

Various embodiments in accordance with the present disclosure will be described with reference to the drawings, in which.

DETAILED DESCRIPTION

Figure 1:
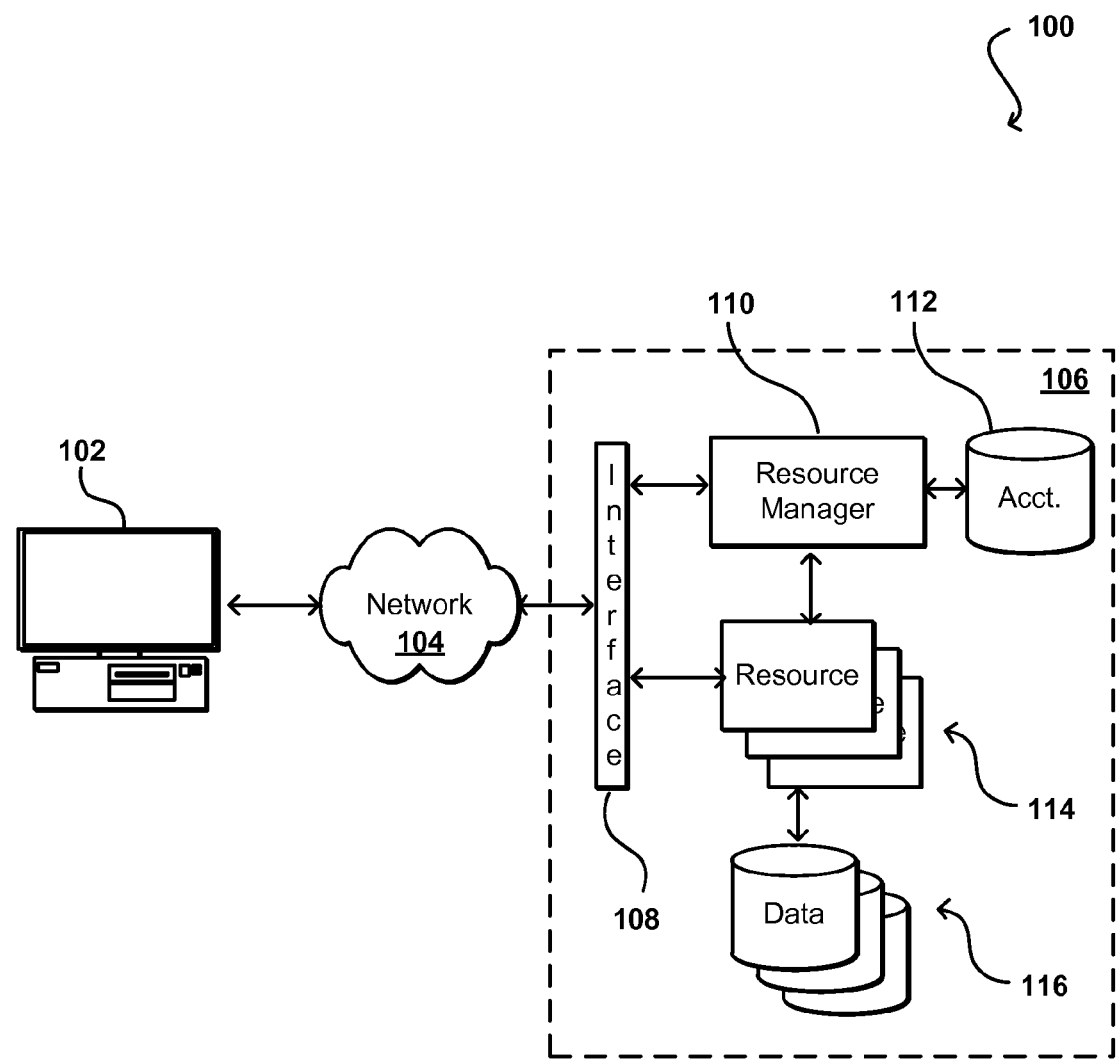
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to approaches for enabling large volumes of potentially sensitive data to be imported to, and exported from, a data storage service or other such location. In some embodiments, a software package such as a data management component can execute on a client device. When a customer (or other person or process) identifies data to be stored to the data storage service, the data management component can identify the data and cause the data to be encrypted using, for example, an object key. The object key can be obtained from a key management service or other such source. The data management component can cause the encrypted data to be stored to a portable storage device, which can be shipped to the data storage service. The data management component can also cause information to be stored to the portable storage device that can help to identify the customer or a customer account, and in some embodiments can include the object key as wrapped by a master key only available to the key management service. When the device is received to the data storage service, an ingestion station can read the encrypted data and other information and cause the encrypted data to be stored to the data storage service. The data thus remains encrypted from the client device through being stored to the data storage service. When a request for the data is received, access to the object key can be obtained (such as by obtaining the key from a key management service or having the key management service unwrap the key using a master key) and used to decrypt the data. The data returned in response to the request can then be the unencrypted data, such that the customer does not have to worry at all about encryption or key management for the data.

Other variations are presented within the scope of the various embodiments. For example, a reverse process can be used to export data using a portable storage device. In some embodiments a customer can take a client device such as a portable storage device or notebook computer to a kiosk or other location in order to have the encrypted data transmitted to the data storage service. In other embodiments the data management component can cause the data to be transmitted to the data storage service after encryption using the appropriate key.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, however, a customer of such a resource environment might have data that is not practical (or desirable) for the user to transmit over a conventional network connection. For example, the data may include sensitive or confidential data that a customer may not be comfortable sending (or permitted to send) over a public network such as the Internet. Further, the amount of data may be such that the customer would prefer not to have to attempt to transmit the data to a remote storage service over a limited bandwidth connection, or over a connection where the customer is charged by the amount of data transmitted, etc.

In such situations, customers can have the option of transferring high density, sensitive customer data by storing the data to one or more portable storage devices, such as removable hard drives, and physically shipping those drives to a storage provider, who can cause the data to be read from the drive(s) and stored to an appropriate data store provided by the storage provider. This provides some level of security, as the data is never transmitted over a public (or other such) network, and provides the benefit that there is no need for a large data transmission over such a network. There can be various disadvantages to such an approach, however. For example, the drive will be out of control of the customer and the provider during shipment. A person coming into contact with the drive could potentially plug the drive into a computing device or data reader, among other such devices, in order to extract the data from the drive, or even steal the drive completely.

One approach customers can use to prevent data theft when the drive is out of control of the customer or provider during shipping is to encrypt the data before shipping the drive. When the drive is received to the storage service, the data can be read and stored to the appropriate data store in encrypted form, which may or may not be known to the provider or storage service. A potential downside is that the customer then has to decrypt the data each time the data is to be accessed. If the provider does not have the key, this requires the encrypted data to be transmitted to the customer, then decrypted at the customer site, which can be undesirable due to latency and bandwidth issues, as well as the fact that in many situations the customer would like an operation to be performed using that data in the storage and/or resource environment.

In another approach, the provider can have the key used to encrypt the data, and can then decrypt the data before storing the data in the data store. Such an approach may not be desirable in all situations, however, as the data will be stored in cleartext or other unencrypted form, which can leave the data potentially vulnerable to persons or devices gaining access to the data. Further, any mistakes in the management of the data on behalf of the storage service can potentially risk exposure of the unencrypted data.

Accordingly, approaches in accordance with various embodiments provide secure mechanisms for data transmission and storage that are convenient for customers to utilize. Various such approaches utilize a key management service (or other such system, service, or component) in order to manage keys on behalf of the user. In some embodiments, a customer can create a key or request that the key management service create a key for use in encrypting customer data (or other data managed by the customer). The customer can then authorize the data storage service to have access to the key for use on behalf of the customer. Using such an approach, the key never needs to be stored by the data storage service such that the data is relatively secure. Further, the access to the key by the storage service enables the storage service to store the data encrypted, but decrypt the data as needed by obtaining the key from the key management service. For example, when an authorized request for at least a portion of the data is received, the storage service can proxy the customer's privileges in order to obtain the key and decrypt the data to be returned to the caller. In some embodiments the key used to encrypt the data can be provided to the storage service, but wrapped in an external key managed by the key management service. In this way, the storage service can maintain the key used to encrypt the data, but in a way that prevents unauthorized parties from using the customer key to decrypt the data.

Figure 2:
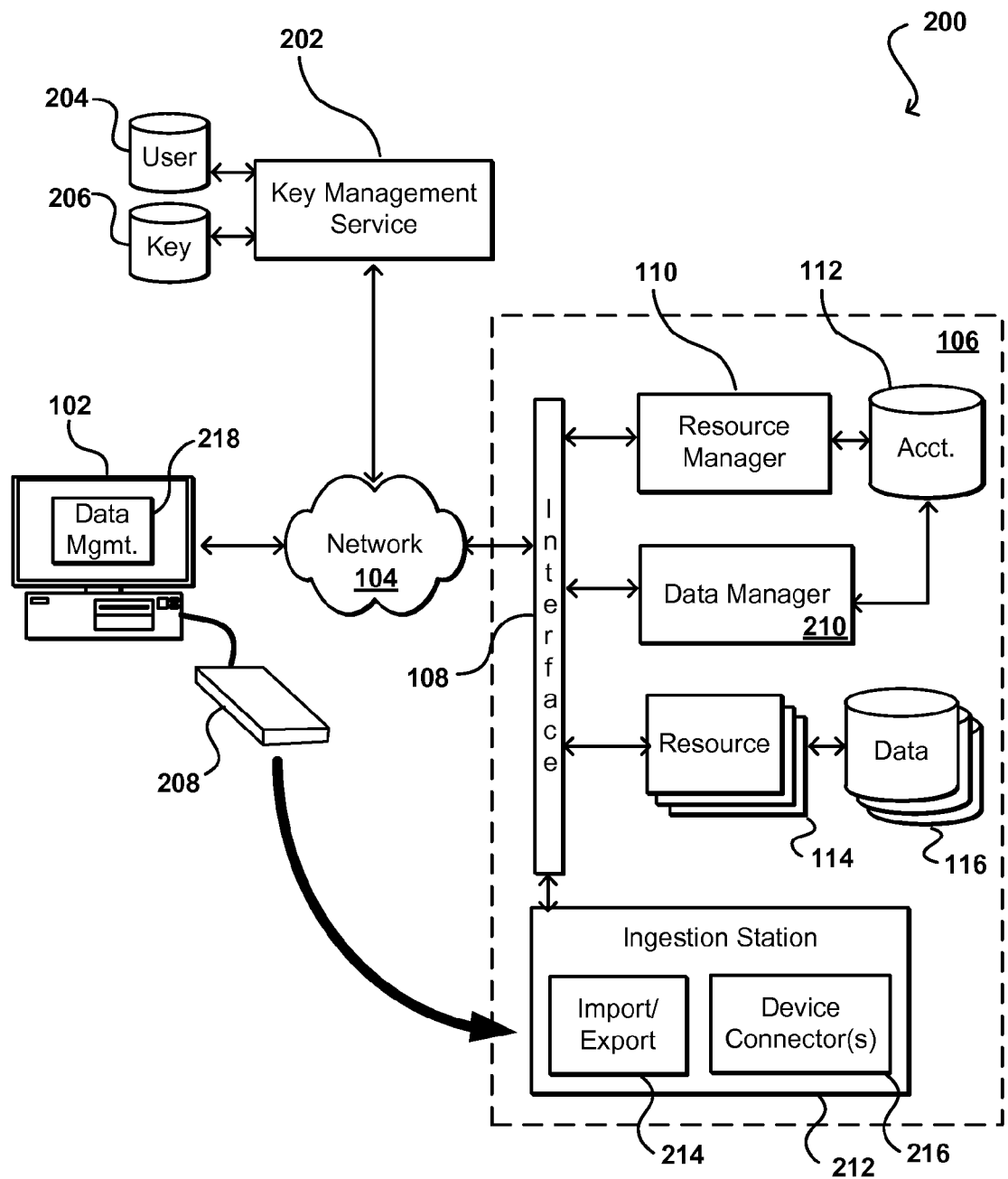
FIG. 2 illustrates an example environment where a storage device storing encrypted data can be received to an ingestion station of a resource environment in accordance with various embodiments.

FIG. 2 illustrates an example situation 200 wherein a customer can utilize a key management service 202 in order to cause data to be securely stored by a data storage service or other such system, service, or environment. In this example, a customer of a resource provider associated with a resource environment 106 can access data using a client device 102. It should be understood that reference numbers are carried over between figures for similar elements for simplicity of explanation, but that such usage should not be interpreted as a limitation on the scope of the various embodiments unless otherwise specifically stated. The client device 102 can be connected to a data storage device 208, such as a portable hard drive or removable storage device having a non-transitory computer-readable storage medium contained therein. These devices can include, for example, magnetic hard drives, optical drives, magnetic tapes, flash memory, and the like. The client device can cause customer data to be stored on the data storage device 208 for purposes of transporting the data to a data ingestion station 212 or other such component of the resource environment 106, such as may be part of a data storage service offered via the resource environment.

In this example, the client device 102 can execute a data management component 218, such as may take the form of software provided by the resource provider (or another such entity) for purposes of encrypting data to be transferred to the data storage service. In some embodiments, a customer setting up an account with the data storage service can download a copy of the software to execute on the client device 102 and/or any other devices or systems associated with the customer. The data management component 218 can enable a customer to specify data that is to be stored by the data storage service. The data management component can also make calls as appropriate, over at least one network 104, to a key management service 202. The data management component 218 can obtain one or more keys from the key management service 202 (including any necessary wrapping or unwrapping) useful to encrypt the data, with the key(s) potentially never being accessible to the customer. The keys can be generated by the key management service 202 or obtained from the customer or other such source, and copies of the keys can be stored in a key data store 206 or other such location. User data stored in a user data store 204 or other such location can be used to determine the appropriate key(s) for a customer request. The ability to utilize a key management service enables the customer to store the data locally in cleartext or another unencrypted form, without worrying about managing one or more encryption keys. The key management in some embodiments is performed by the data management component 218 and the key management service 202, completely independent of the customer. In some embodiments the customer will have data stored unencrypted in a local data center. The customer can instruct the data management component 218 to transmit specified data to the remote data storage service. The data management component can then contact the key management service 202 for the appropriate key, encrypt the specified data under the key, and cause the encrypted data to be stored to the portable storage device 208. Once the encrypted data is written to the portable storage device 208, the device can be transported to an ingestion station 212 of the resource environment 106. Any person intercepting the portable storage device 208 could then only access encrypted data without the necessary encryption key, as the encryption key would not be stored (at least unwrapped and accessible) on the portable storage device.

The portable storage device 208 can be transported to an ingestion station location using any appropriate transport mechanism, such as by a courier or commercial carrier. When received to a location associated with the resource provider environment 106, the drive can be unpacked and placed into a data ingestion station 212. In at least some embodiments, the data ingestion station 212 can include one or more computing devices or import/export components 214, which can comprise hardware and/or software, for importing data from a data storage device or exporting data to a data storage device, among other such options. The data ingestion station 212 can also include one or more device connectors 216 capable of connecting to the portable storage device for purposes of at least data transfer. It should be understood that there can be other appropriate connectors or components as well, such as may be used to power, communicate with, and/or control a data storage device, and the connectors may have different configurations based at least in part upon the different types of devices that are supported. In this example, the data ingestion station 212 can utilize a dedicated application programming interface (API) or other such interface or component an interface layer 108 of the resource environment 106 to cause the encrypted data to be uploaded or otherwise transferred to the appropriate data management components 210 of the data storage service, such as may include at least one encryption manager or other such component. In this way, the data remains encrypted from the customer site at least until the data is received by the data storage service. If a wrapped version of the key was stored in the portable computing device 208, that key can also be uploaded using the API (or another appropriate interface). Otherwise, the data storage service can store metadata received with the portable storage device 208 to obtain access to the key from the key management service 202 as needed. In some embodiments the key will be received separately from the customer or the key management service using a separate API. In other embodiments the key will not be received from the key management service until needed, at which time the data storage service can utilize information for the customer (or customer account) to determine and obtain the appropriate key from the key management service. Various other such approaches can be utilized as well within the scope of the various embodiments. The data can remain encrypted in the data storage service, in at least some embodiments, unless otherwise instructed. In order to decrypt the data, an incoming request in at least some embodiments would need to be authorized both to access the data and to access the key from the key management service.

In one embodiment, the customer might subsequently want to access at least a portion of the encrypted data stored in the data storage service. The customer can then use the client device 102 (or another appropriate device) to submit a request across the at least one network 104 to an appropriate interface (e.g., dedicated API) of the resource environment 106. The request can include information, such as a customer identifier, username, or account number, among other such options, that can be used to determine whether or not to grant access to the data. As mentioned, this can include at least two determinations. As a first determination, the resource environment can send information to a resource manager 110, data manager 210, and/or other such component or service configured to determine whether the request is authorized to have access to the data, at least in encrypted form. As a second determination, information for the request can be sent to the key management service 202 (or a separate component within the resource environment) to determine whether the request (or an entity or source of the request) is authorized for access to the corresponding key. In some embodiments a single determination might be used to determine access rights to the data and the key, among other such options.

If the access is granted, the data storage service can obtain the key from the key management service 202 (unless the key is already stored locally, for example) and utilize that key to decrypt the appropriate portion(s) of the encrypted data needed to satisfy the request. The decrypted data can then be transmitted to the customer, client device 102, or other specified destination in response to the request. In some embodiments the decryption on behalf of the customer might be used to perform a process or calculation, whereby the decrypted data might be deleted after use and only the result returned to the customer, among other such options.

Such an approach can provide a simple, straightforward way for a customer to cause a large amount of sensitive data to be stored by a data storage service in a way that provides significant data security. The customer can use the data management component 218 to indicate the data that is to be stored in the data storage service. The data management service can then work with the key management service 202 to obtain the appropriate key, encrypt the data, and cause the encrypted data to be stored on the portable storage device 208, without any involvement or other knowledge on the part of the customer. The customer can then physically ship the portable storage device 208 with the encrypted data to the data ingestion station 212. When the customer subsequently wants to access the data, the customer can submit a conventional request that can be processed by the data storage service, and if access is granted the customer can receive back the appropriate unencrypted data. Such an approach enables the data to be transmitted and stored securely without the customer ever having to worry about manually managing keys or encrypting data, etc. In at least some embodiments there is no customer-visible encryption as part of the process. Further, because the data is always encrypted the data will be secure even in the presence of malicious code or firmware on the portable storage device.

In some embodiments, the data storage service might utilize a master key to wrap the object keys, where each object key is used to wrap a data object for a customer. The master key typically will not be exposed to customers outside the resource environment in order to preserve the security of the wrapped keys. The master key can be provided from the key management service 212, created within the resource environment 106, or otherwise obtained. When a customer key is received that is used to encrypt customer data stored by the data storage service, the customer key (here an object key) can be wrapped with the master key and stored to the data storage service. This enables the key to be stored with the encrypted data but in a way that prevents the key from being accessed by an unauthorized party and used to decrypt the customer data. There can be a single master key or multiple master keys, and there can be a different object key for each object or for each customer, among other such options. In some embodiments each set of encrypted data is stored as a data object, with the corresponding wrapped key stored as metadata associated with the data object. An unauthorized party would need to obtain the encrypted data as well as the master key needed to unwrap the appropriate object key(s).

In some embodiments the master key is maintained by the key management service 202 and never exposed outside the service. In such an embodiment, an unwrap operation can involve a call to an API associated with the key management service that provides information about the wrapped object (or the wrapped object itself) as well as credentials useful to obtain access, whereby the key management service can unwrap the object (here, an object key) and return the unwrapped object key without exposing the master key. In such a situation the key management service can determine whether or not to unwrap the object key to enable access. In some embodiments the portable data storage device would include a similar set of metadata along with the encrypted data, where the metadata can include information such as an object name that includes a path, information useful to determine the master key (if appropriate), and encryption format data, among other such information. The portable device can also include the object key wrapped by the master key. Before the portable device is shipped, the key management service can wrap the object key using the master key and provide the wrapped key for inclusion in the device. An advantage so such an approach in at least some embodiments is that the customer data will take the form of one or more objects that are indistinguishable from other objects normally uploaded for storage in the data storage service. The objects can then be managed similarly in the system, which can enable the same functionality to be provided without additional complexity for the encrypted objects.

The data management component 218 can take a number of different forms as well. For example, the component can be a set of Java® code to be executed on the client device. When executed, the component can operate a virtual Web server, for example, that can be configured with the portable storage device as a disk for the Web server. The software executing on the client device then can do 'puts' to the virtual Web server and writes to the disk. In an alternative embodiment, a virtual appliance can be provided to the customer that the customer can utilize as the portable storage device. The virtual appliance can include the necessary instructions to cause the encryption to be performed as discussed herein, then upon completion the appliance can be disconnected and returned to the resource provider environment in order for the encrypted data to be ingested into the data storage service. Data can also be spanned across multiple drives or devices as well in various embodiments. The drives can all utilize the same key, can each utilize a different key, or there can be a set of keys from which each of the drives can utilize one of those keys, with more keys or more drives, etc.

A similar process can be used to export data from such a system. For example, a number of encrypted data objects could be stored by the data storage service in the resource environment 106. The data objects can be exported to a portable storage device 208 in their encrypted form, such as via an import/export component 214, along with the metadata needed to decrypt the object. In some embodiments one or more wrapped keys might also be provided, where those keys can be unwrapped using the key management service 202, for example. The storage device 208 with the data can then be shipped to the customer (or another appropriate entity). Upon arriving at the customer site, the portable data storage device 208 can be connected to an appropriate computing device 102 operable to transfer the encrypted data from the device. The client device (or another device part of the client environment) can obtain the appropriate object key(s), such as by sending a wrapped version of the key to a key management service 202 in order to obtain an unwrapped version of the object key. The data can be decrypted at the client site using the object key in order to enable the data to be available in cleartext at the client site without the client having to manage any keys or actively engage in the decryption process. In some embodiments the client can utilize a data management component, similar to the component discussed above, which can automatically obtain the object key and decrypt the data such that the customer can be completely removed from the decryption process and can simply see that cleartext data was obtained through the import process. The cleartext was not available during any point in the process except after decryption at the client site.

The data encrypted and transmitted on the portable storage devices include be any appropriate types of data. These can include, for example, tables of data or snapshots of data, as well as volumes or other collections of data. The data can also include deltas, incremental logs, or other updates used to update data stored by the data storage service, among other such options.

Figure 3:
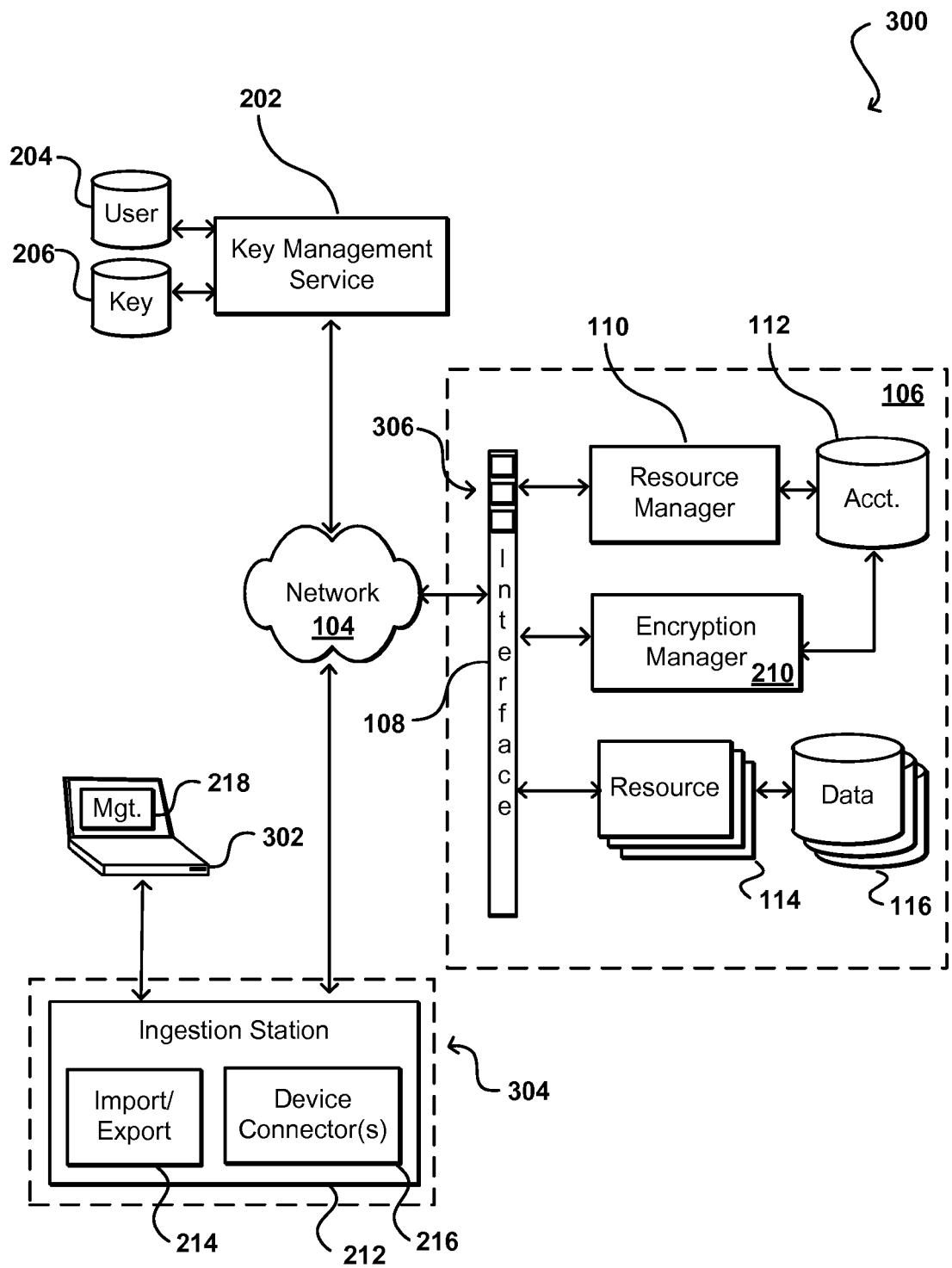
FIG. 3 illustrates an example environment where a user can cause encrypted data to be received to an ingestion station for transmission to a resource environment in accordance with various embodiments.

FIG. 3 illustrates another example situation 300 wherein a customer is able to have data stored by a data storage service in accordance with various embodiments. In this example, however, the customer does not have to physically ship a data storage device in order to cause the data to be encrypted and stored by the data storage service. The user does not even have to give up physical possession of a storage device, but can instead take the device (or even a computer 302 storing the data) to a kiosk 304 or other physical device or component including an ingestion station 212. This can be a kiosk in a mall, department store, dedicated space, or other such location, which in many cases will be in a different geographic (e.g., neighborhood, city, state, or country) location than the data store, data server, or data storage system used to store the encrypted customer data. Further, while the term "kiosk" is used herein, it should be understood that this does not require any specific physical configuration and instead refers to a set of components (hardware and/or software) capable of transferring data to and/or from a device, typically for transfer or storage to another device. The kiosk can include one or more device connectors 216, as discussed above, that can enable the computer 218 or storage device to be connected to the ingestion station 212. As discussed previously, a management component 218 on the computer 302 can cause the data to be encrypted using a key from the key management service 202 or other such source. An import/export component 214 or similar system or service of the ingestion station 304 can cause the encrypted data from the computer 302 to be transferred across at least one network 104 to the data storage service, whereby the encrypted data can be stored in a data store 116 of the resource environment 106. It will often be the case that the management component 218 will encrypt the data before taking the computer 302 to the kiosk, as the encryption process for a large amount of data can take a significant amount of time. Once connected to the ingestion station, the encrypted data can be downloaded to the ingestion station for subsequent upload to the data storage service, or can be transmitted directly to the service via the ingestion station. Various other approaches can be utilized as well within the scope of the various embodiments.

Figure 4A:
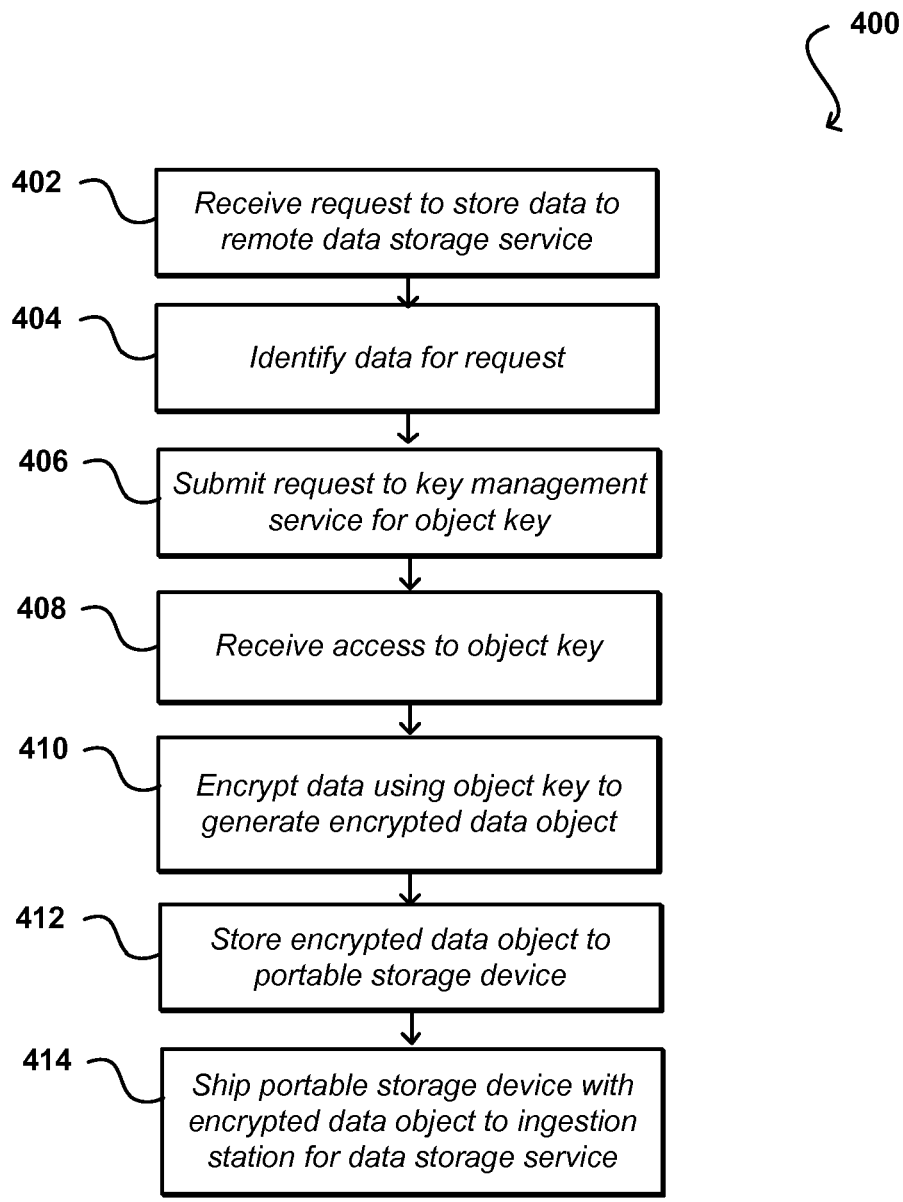
FIGS. 4A, and 4B illustrate portions of an example process for transferring encrypted data on a portable storage device to a data storage service that can be utilized in accordance with various embodiments.

FIG. 4A illustrates an example process 400 for enabling encrypted data to be stored in a remote data service that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example a request is received 402 to cause a specified set of data to be stored to a remote data storage service. In this example the request (or other form of instruction) is received to a data management component or other software module or package installed and executing on a client device. The data can be identified 404 based at least in part upon the request. A request can be sent 406 to a key management service, or other such source, for access to a key to be used in encrypting the data. In some embodiments the key may be stored locally such that a separate request does not need to be sent. Access to the key can be received 408 from the key management service and the key used to encrypt 410 the data identified for the request. The encrypted data can then be stored 412 to a portable data storage device, such as a portable hard drive. The portable data storage device with the encrypted data stored thereon can then be shipped 414 to a destination of a remote ingestion station in order to be extracted from the drive and stored, encrypted, to the data storage service.

Figure 4B:
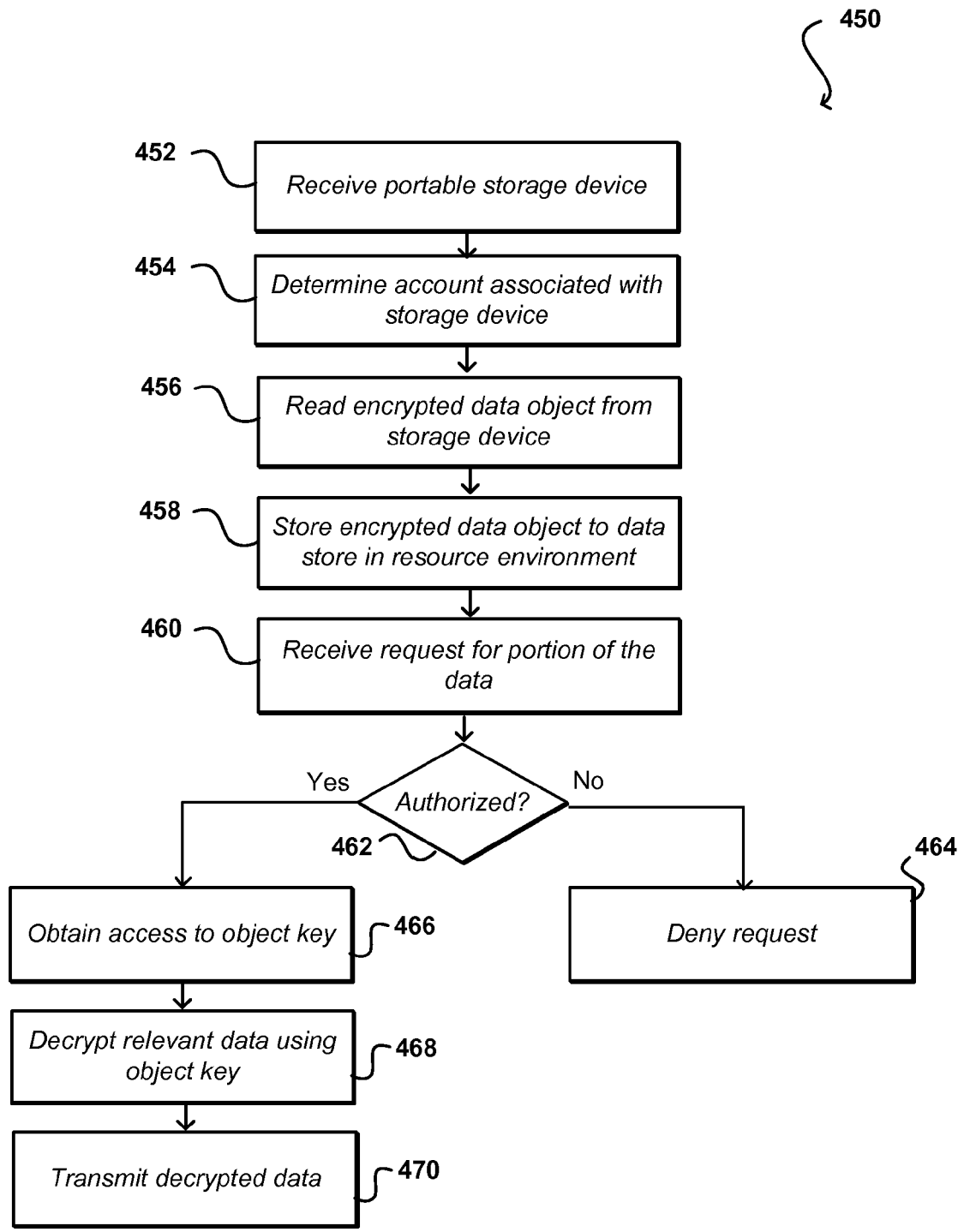

FIG. 4B illustrates a second portion 450 of the process that can be utilized in accordance with various embodiments. In this example, a portable storage device is received 452 to an ingestion station of a resource environment. A user or user account associated with the device is determined 454, such as by reading unencrypted data or metadata stored on the device. The encrypted data can then be read 456 from the device and caused to be stored 458 to an appropriate location in the resource environment. In some embodiments a wrapped key will also be extracted from the drive and stored in the resource environment. Subsequently, a request for at least a portion of the data is received 460. A determination can be made 462 as to whether the request is authorized to obtain access to the data. If not, the request can be denied 464. If access is authorized, information for the user or a user account associated with the data can be sent to a key management service in order to obtain 466 access to the key that was used to encrypt the data. In other embodiments the key might be stored locally, or a wrapped key stored that must be sent to the key management service in order to obtain access to the unwrapped key. In still other embodiments a wrapped object key might be stored on the received device, whereby the wrapped key is sent to the key management service to be unwrapped using a master key kept by the key management service, among other such options. Using the object key, the relevant encrypted data is decrypted 468 in the storage environment. The decrypted data can then be transmitted 470 to the client in response to the request.

Figure 5:
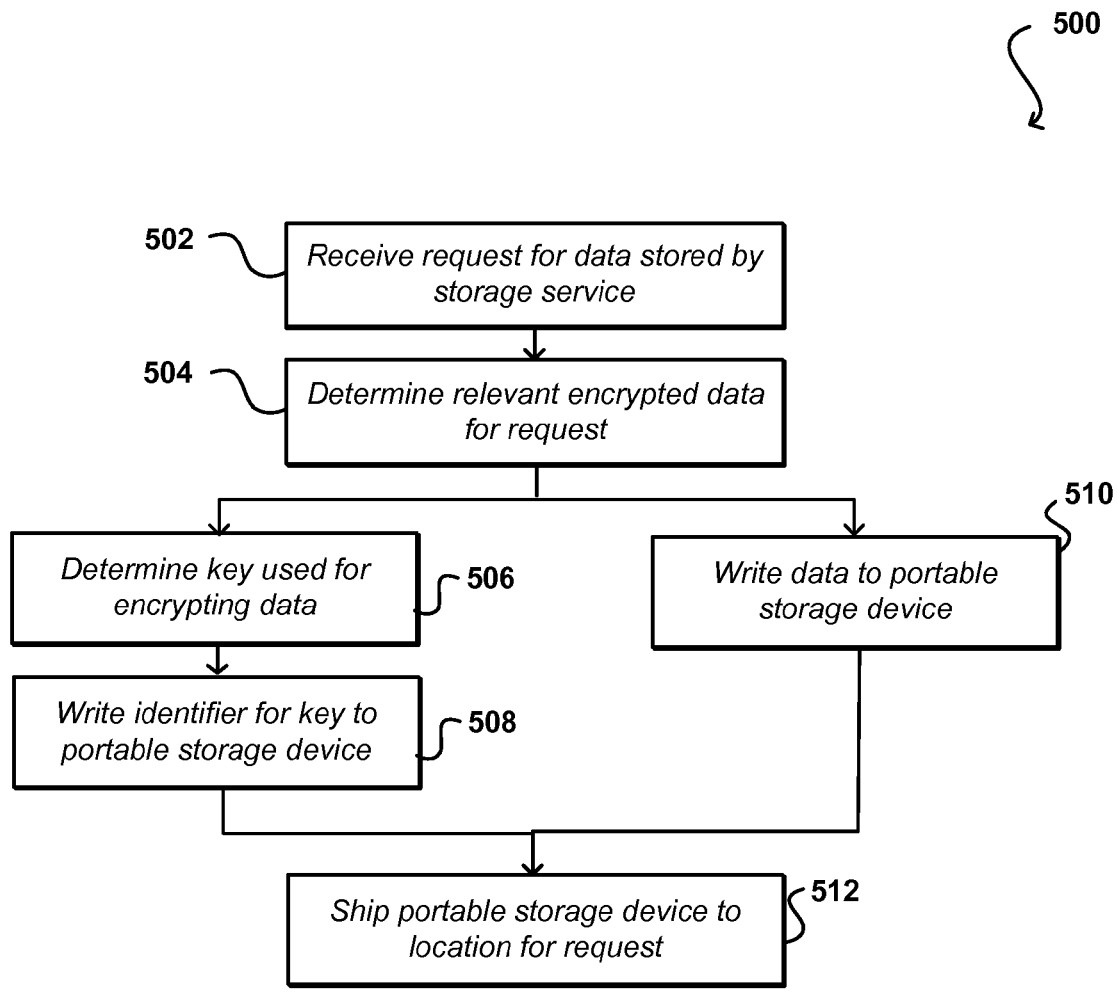
FIG. 5 illustrates an example process for transferring encrypted data on a portable storage device from a data storage service that can be utilized in accordance with various embodiments.

FIG. 5 illustrates a similar process 500 that can be utilized to export encrypted data in accordance with various embodiments. In this example, a request for encrypted data is received 502. The corresponding data can be determined 504, it can be determined whether the data is encrypted 506. If so, the data can be written 510 to a portable storage device for transport to the intended recipient. Along with the data, the key that was used to encrypt the data can be determined 506, and identifying information (such as a key identifier) can be written 508 along with the encrypted data to the portable storage device. The identifying information can be any appropriate information useful in identifying to the key for use in decrypting the data. The encrypted data and key identifier can then be shipped 512 to the customer or other intended recipient specified by the request. When the encrypted data is read to a computer device associated with the user, for example, a data management component can obtain the key to use in decrypting the data at the client location as appropriate.

Figure 6:
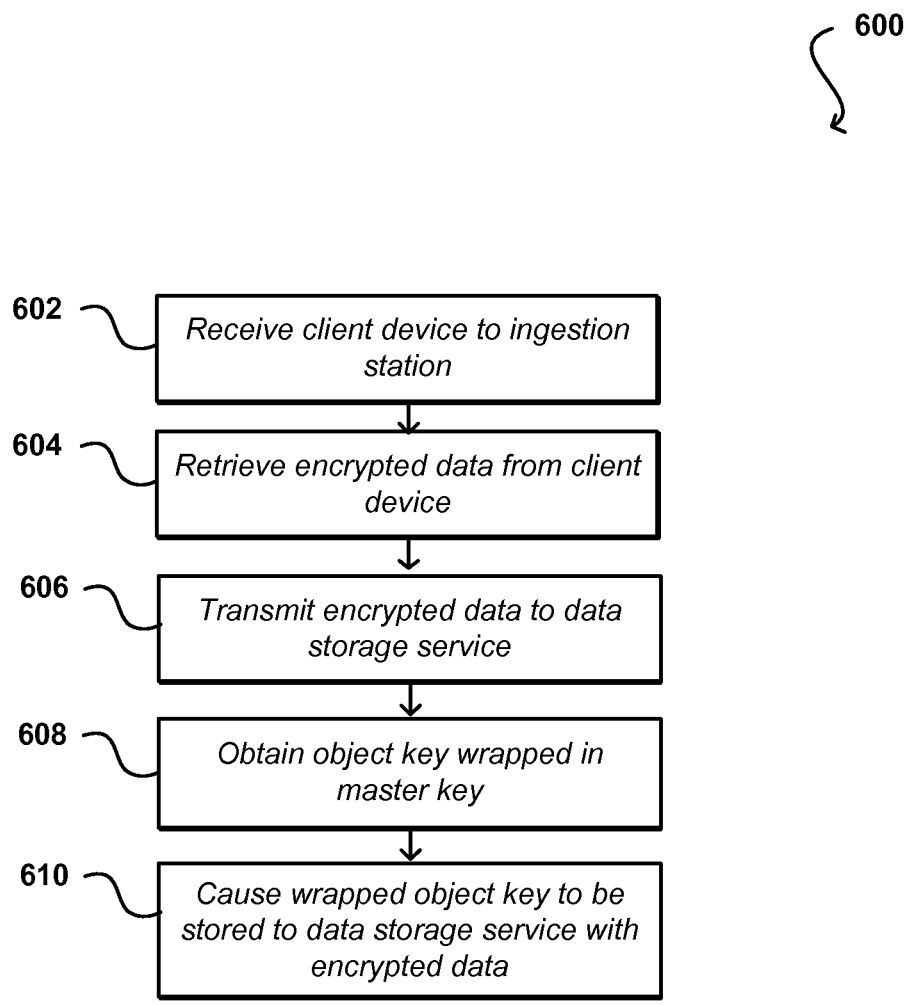
FIG. 6 illustrates an example process for transferring encrypted data on a portable device to a data storage service by way of a kiosk that can be utilized in accordance with various embodiments.

FIG. 6 illustrates an example process 600 that can be utilized in accordance with various embodiments. In this example, a client device is received 602 to an ingestion station of a kiosk or other such device or system capable of extracting data from the client device. The client device can be a storage device, such as a portable hard drive, or a computing device such as a laptop or tablet computer, among other such options. After connecting with the client device, encrypted data can be retrieved 604 from the client device. The encrypted data then can be caused to be transmitted 606 to a data storage service capable of storing the encrypted data. In this example a wrapped object key can also be retrieved 608 from the storage device can transmitted 608 to the data storage service. The encrypted data and wrapped key can then be caused 610 to be stored by the service. A subsequent request for the data can be received, such as to a data interface component configured to decrypt the data using the unwrapped key and transmit the data in response to the request. The key can be unwrapped in response to the request as discussed above, the data decrypted, and decrypted data transmitted in response to the request.

Figure 7A:
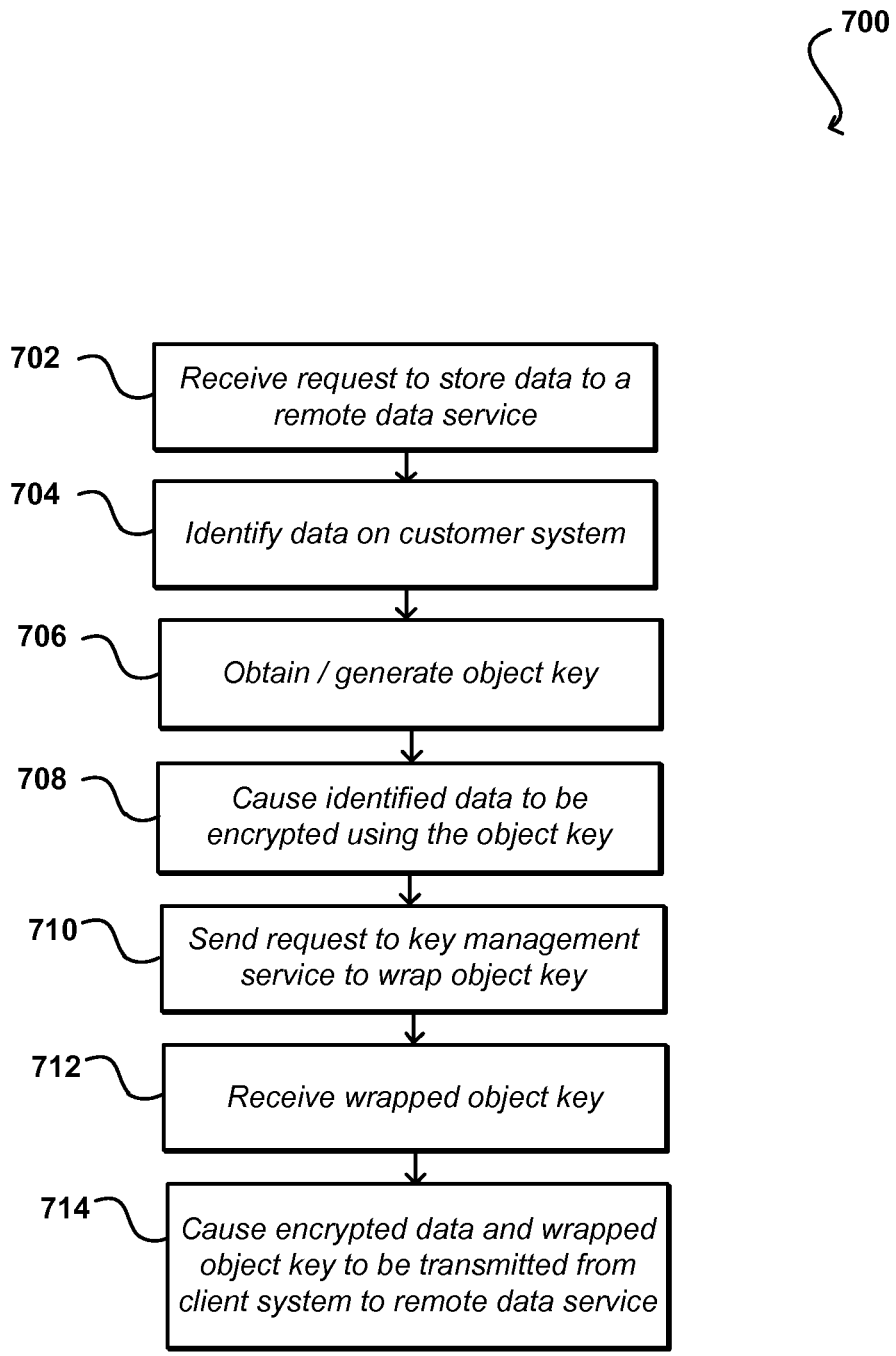
FIGS. 7A and 7B illustrate portions of an example process for transferring encrypted data to a data storage service that can be utilized in accordance with various embodiments.

FIG. 7A illustrates another example process 700 that can be utilized in accordance with various embodiments. In this example, a request is received 702 to cause a specified set of data to be stored to a remote data storage service. In this example the request (or other form of instruction) is received to a data management component or other software module or package installed and executing on a client device. The data can be identified 704 based at least in part upon the request. The object key can then be obtained 706, such as by generating the object key or sending a request to a key management service or other such source. In some embodiments the key may be stored locally such that a separate request does not need to be sent. The data identified for the request then can be caused 708 to be encrypted using the object key. A request can be sent 710 to a key management service to wrap the object key with a master key, whereby the wrapped object key can be received 712 and the encrypted data and wrapped object key caused 714 to be transmitted from the client system to a remote data storage service using an appropriate network connection, such as a secure Internet connection.

Figure 7B:
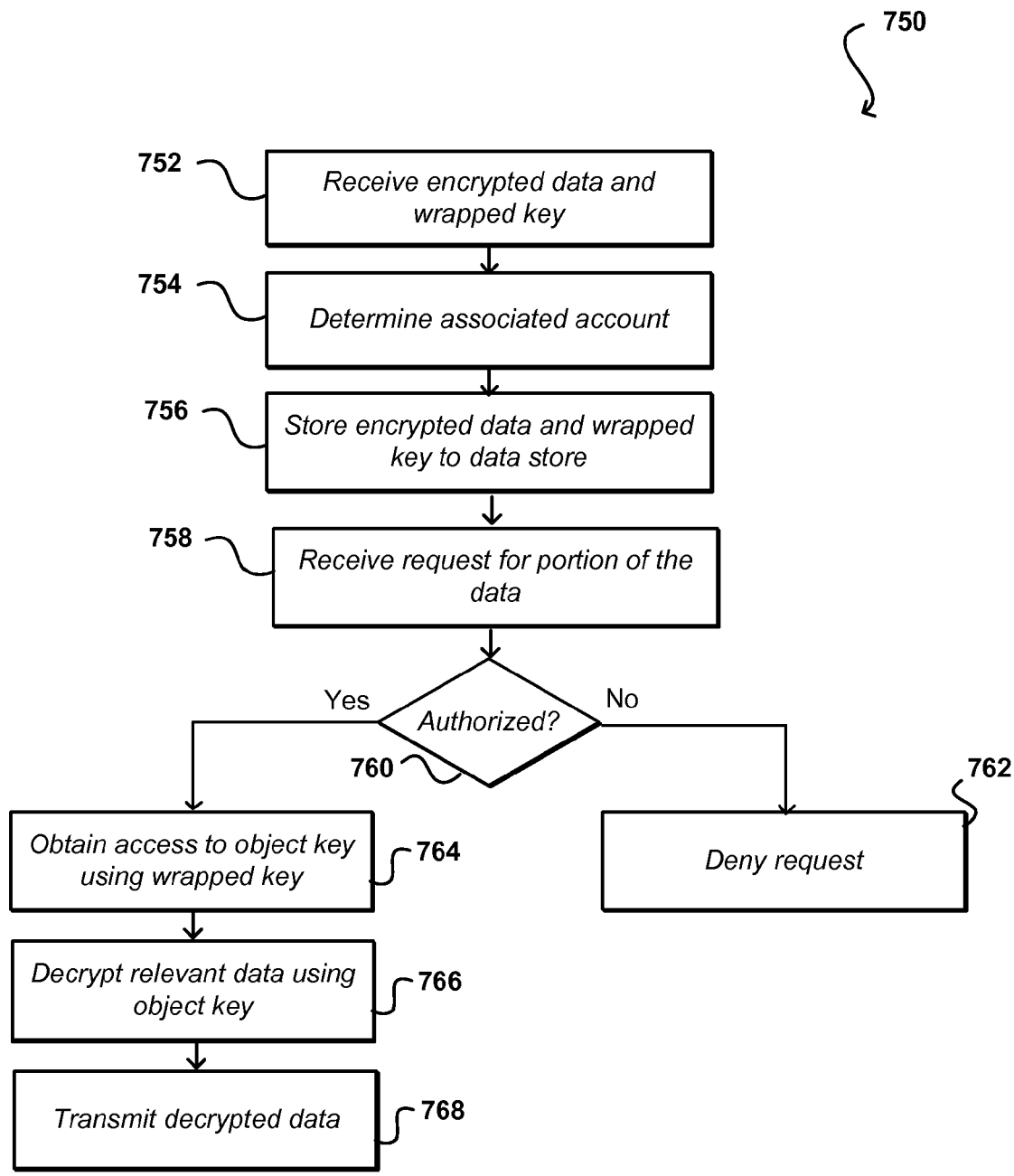

FIG. 7B illustrates a second portion 750 of the process that can be utilized in accordance with various embodiments. In this example, the encrypted data and wrapped key are received 752 to the data storage service. A user or user account associated with the data is determined 754, such as by reading unencrypted data or metadata stored on the device. The encrypted data and wrapped key can then be stored 756 to an appropriate location in the resource environment. Subsequently, a request for at least a portion of the data is received 758. A determination can be made 760 as to whether the request is authorized to obtain access to the data. If not, the request can be denied 762. If access is authorized, the wrapped key can be sent to a key management service in order to obtain 764 access to the object key that was used to encrypt the data. Using the object key, the relevant encrypted data is decrypted 766 in the storage environment. The decrypted data can then be transmitted 768 to the client in response to the request. If the request is not authorized, the request can be denied 762.

Figure 8:
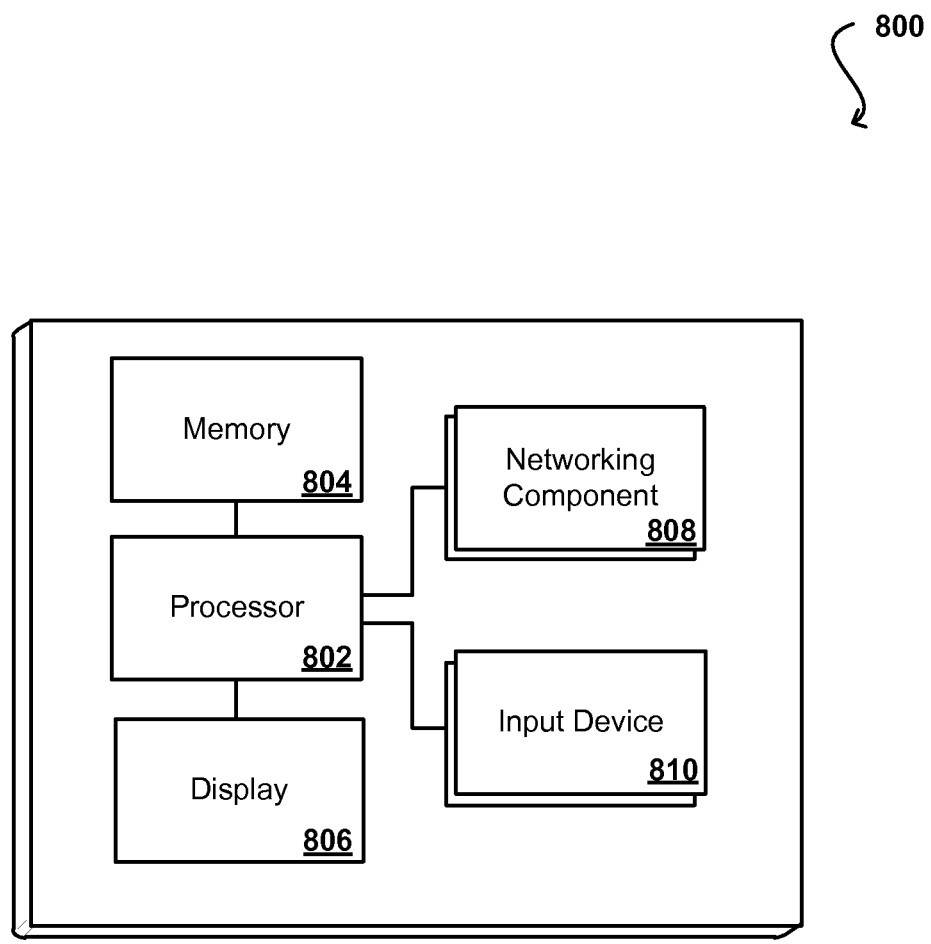
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    a data management component configured to be installed on a client device for a customer having an account with the resource provider and configured to receive an indication of customer data for storage at a remote data service of the resource provider;
    the data management component configured to obtain a key for encrypting the customer data for storage to a portable storage device including at least one non-transitory computer-readable storage medium;
    a data store provided as part of the remote data service for storing the customer data;
    a key management system comprising software for managing access to a key using identifying information for the key;
    a data ingestion station configured to receive the portable storage device and cause the customer data, encrypted under the key, to be stored to the data store along with identifying information for the key;

an interface for receiving a request for a portion of the customer data; and a data interface component configured to decrypt the portion of the customer data using the key and configured to transmit the portion of the customer data, decrypted using the key, to an address specified by the request.

2. The system of claim 1, further comprising:

the key management system configured to provide access to the key to at least one of the customer or the data interface component in response to an authorized request.

3. The system of claim 1, wherein the key management system is further configured to maintain a master key for wrapping the key, the master key unexportable outside the key management system, the key management system configured to provide the key wrapped with the master key for storage with the customer data on the portable storage device.

4. The system of claim 1, wherein the data ingestion station is in a different geographic location than the data store, the data ingestion station including at least one data transmission component for transmitting the customer data to the data store.

5. A computer-implemented method, comprising:

accessing customer data stored on a portable storage device received from a customer having an account with a resource provider, the portable storage device including at least one non-transitory computer-readable medium, the customer data encrypted under a key;

managing access to the key, in a key management system comprising software, using identifying information for the key;

storing the customer data, encrypted under the key, to a data store provided by the resource provider;

receiving, on behalf of the customer, a request for a portion of the data;

obtaining access to the key;

decrypting the portion of the data using the key; and providing the portion of the data, decrypted using the key, in response to the request.

6. The computer-implemented method of claim 5, further comprising:

receiving the portable storage device, the portable storage device having been shipped by the customer to a location associated with an ingestion station for the data store, the ingestion station and data store being part of a data storage service of the resource provider.

7. The computer-implemented method of claim 5, further comprising:

receiving the key with the customer data stored on the portable storage device, the key being wrapped with a master key that is maintained in the key management service; and storing the key to the data store, wherein the obtaining of the access to the key includes sending the key, wrapped in the master key, to the key management service and receiving back access to the key.

8. The computer-implemented method of claim 5, wherein the key management service performs an authorization before providing access to the key.

9. The computer-implemented method of claim 5, further comprising:

receiving metadata with the customer data stored on the portable storage device, the metadata including the identifying information, wherein the obtaining of the access to the key includes sending at least a portion of the metadata to the key management service and receiving access to the key.

10. The computer-implemented method of claim 5, further comprising:

sending the customer data, encrypted under the key, through a dedicated application programming interface (API) for storage to the data store.

11. The computer-implemented method of claim 5, further comprising:

transmitting the customer data, encrypted under the key, to an interface layer for the data store, the portable storage device received to an ingestion station at a different geographic location than the data store.

12. The computer-implemented method of claim 5, wherein the portable storage device includes at least one of a magnetic hard drive, an optical disc, a magnetic tape, a flash memory, or a solid state memory device.

13. The computer-implemented method of claim 5, further comprising:

receiving at least one additional portable storage device including additional customer data, the additional customer data encrypted under the key or a different key.

14. A non-transitory computer-readable storage medium storing instructions that, when executed by at least one processor of a computer system, cause the computer system to:

access customer data stored on a portable storage device received from a customer having an account with a resource provider, the portable storage device including at least one non-transitory computer-readable medium, the customer data encrypted under an key;

manage access to the key, in a management system comprising software, using identifying information for the key store the customer data, encrypted under the key, to a data store provided by the resource provider;

receive, on behalf of the customer, a request for a portion of the data;

obtain access to the key;

decrypt the portion of the data using the key; and provide the portion of the data, decrypted using the key, in response to the request.

15. The non-transitory computer-readable storage medium of claim 14, wherein the portable storage device was received via shipment by the customer to a location of an ingestion station for the data store, the ingestion station and data store being part of a data storage service of the resource provider.

16. The non-transitory computer-readable storage medium of claim 14, wherein the instructions when executed further cause the computer system to:

receive the key with the customer data stored in the portable storage device, the key being wrapped with a master key that is managed by the management service; and store the key to the data store, wherein the obtaining of the key includes sending the key, wrapped in the master key, to the management service, and receiving back the unwrapped key.

17. The non-transitory computer-readable storage medium of claim 14, wherein the instructions when executed further cause the computer system to:

receive metadata with the customer data stored on the portable storage device, the metadata including the identifying information, wherein the obtaining of the access to the key includes sending at least a portion of the metadata to the management service and receiving back the key.

18. The non-transitory computer-readable storage medium of claim 14, wherein the instructions when executed further cause the computer system to:
transmit the customer data, encrypted under the key, to an interface for the data store, the portable storage device received to an ingestion station at a different geographic location than the data store.

19. The non-transitory computer-readable storage medium of claim 14, wherein the instructions when executed further cause the computer system to:
receive at least one additional portable storage device including additional customer data encrypted under the key or a different key.

20. A computer-implemented method, comprising:
receiving a request to obtain data stored to a data storage service, the data being encrypted under a key when stored in the data storage service;
managing access to the key, in a key management system comprising software, using identifying information for the key;
storing the portion of the data, encrypted under the key, to a portable storage device;
storing the identifying information to the portable storage device; and
shipping the portable storage device to a client destination;
obtaining, from a data management component of the client destination, access to the key, using the identifying information; and
decrypting the portion of the data using the key; and
providing the portion of the data decrypted using the key in response to the request.

* * * * *